HOUSTON & ROSS.
Car Brake.
No. 9,141.
Patented July 20, 1852.
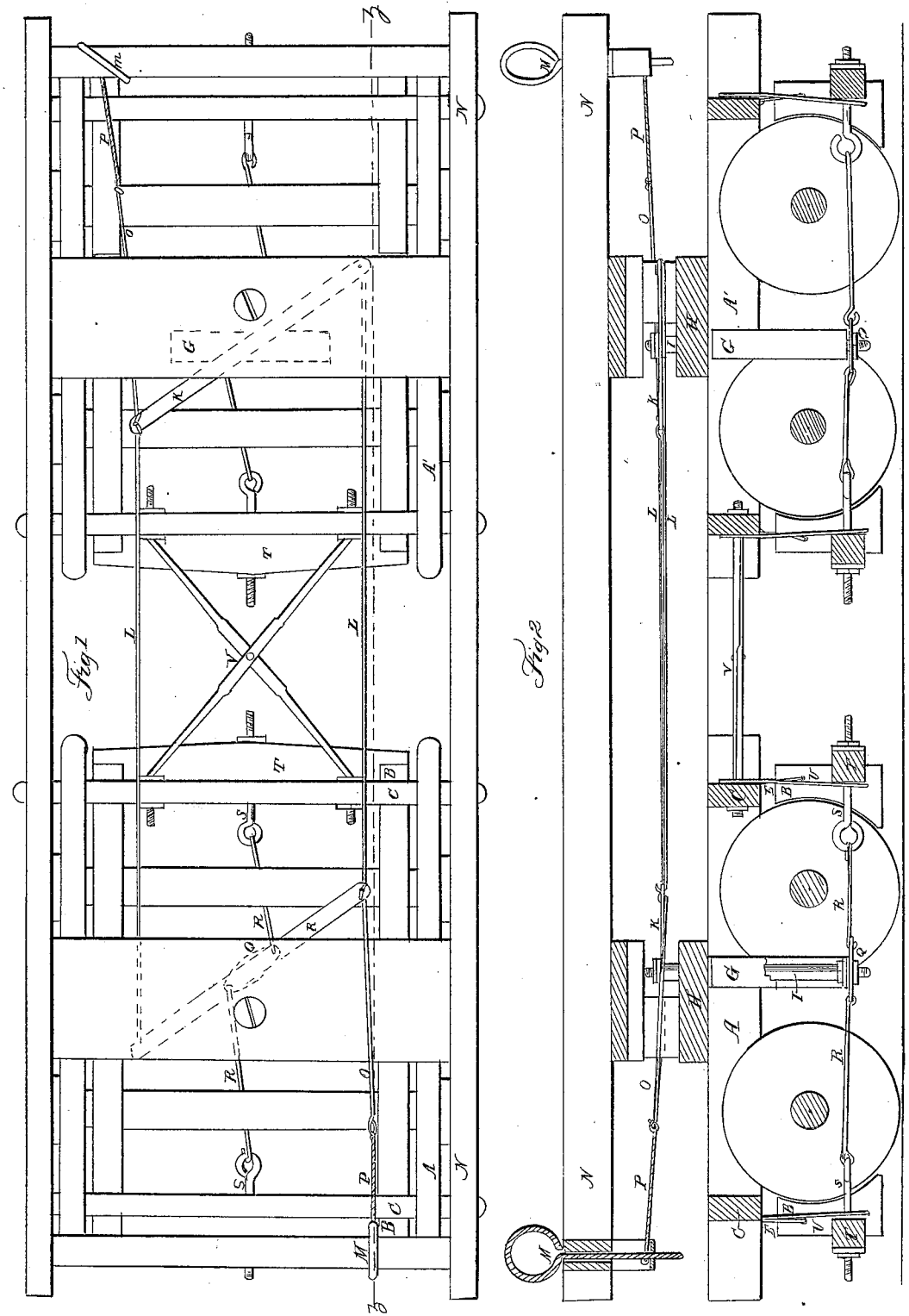

UNITED STATES PATENT OFFICE.

J. HOUSTON AND E. ROSS, OF MANCHESTER, NEW HAMPSHIRE.

RAILROAD-CAR BRAKE.

Specification of Letters Patent No. 9,141, dated July 20, 1852.

*To all whom it may concern:*

Be it known that we, JOHN HOUSTON and EBENEZER ROSS, both of the city of Manchester, in the county of Hillsboro and State of New Hampshire, have invented a new and useful Improvement in Apparatus for Operating the Brakes of Railroad-Cars; and we do hereby declare that the same is described and represented in following specification and accompanying drawings.

Most of the contrivances for operating the brakes upon railroad cars have been so constructed heretofore that if one bar, wheel lever or connecting link gave way not one of the remaining brakes can be operated but are rendered entirely useless as each brake is connected to and dependent upon the others.

The object of our invention and improvement is to remedy the defects heretofore existing, and therefore we have constructed our apparatus for operating the brakes so that if one bar, wheel, lever or connecting link gives way the others may be operated as before; so as to be more certain to stop the train and consequently make it more safe for those who are being conveyed in it.

To enable others skilled in the art to make and use our invention we will proceed to describe its construction and operation, referring to the drawings before mentioned in which the same letters indicate like parts in all the figures.

Figure 1 is a plan, and Fig. 2 a section representing the several parts above the line z, z, of Fig. 1.

A A′ are two truck carriages with four wheels each constructed in the usual form in common use upon railroads with brakes B B, &c., for each wheel which brakes are hung to the frame C by the links E E. The wrought iron stands G G are fastened to the under side of the cross pieces H H of the truck frames, the lower ends of which stands form the boxes for the vertical shafts I I the upper bearing of which shafts is in the cross pieces H H. The levers K K are firmly fastened to the top of the shafts I I and these levers are connected together by the rods L L and one end of each lever is connected to the vertical shafts M M in the bed or car frame N N, by the links O O and cords or chains P P. The levers Q Q are firmly fastened to the lower ends of the shafts I I; the ends of these levers are connected by the links R R and eye bolts S S to the brake bars T T which bars are fastened to the brakes or brake shoes B B. Now if either of the shafts M M are turned so as to operate the levers and vertical shafts each of the brakes is brought against each wheel with equal force so as to retard or stop the car directly, and to release the brakes the shaft M is turned the other way and they are all released simultaneously; and the springs U U fastened to the truck frame press back the brake bars so as to swing the brakes clear of the wheels.

The nuts upon the ends of the rods which form the diagonal cross V may be set so as to allow the trucks to vibrate more or less as may be required for the curves in the road upon which they run.

It is apparent that if the link R, eye bolt S or bar T should give way, it would only disable the brakes of two wheels, leaving the brakes upon six wheels as serviceable as before. Or if either of the rods L should be broken all the brakes could be operated from one end and half of them from the opposite end. Or if either of the chains P P or links O O should be broken all the brakes could be operated at the opposite end; and it is not at all probable that this apparatus will all break at once so as to disable all the brakes and render them useless; while in many and perhaps most of the brakes in use at the present day if one wheel lever or link gives way the whole are rendered useless so that the after progress of the train is at great hazard. We contemplate that instead of the vertical shafts I I and levers Q some horizontal shafts or pulleys may be used in the stands G G and chains instead of the links R R and still operate all the brakes which are not disabled; and that our invention applies as well to four as to eight wheel cars.

What we claim as our invention and desire to secure by Letters Patent is,

The arrangement substantially as set forth of the levers K and Q; rods R and vertical shaft I, applied to each truck of a rail road car, in combination with the method of connecting the levers K by means of the links L; so that if one or more of the links or bars should break, so as to render part of the brakes useless the remainder are still serviceable for the purposes intended.

In testimony whereof we have hereunto signed our names before two subscribing witnesses.

JOHN HOUSTON.
EBENEZER ROSS.

Witnesses:
C. F. LIVINGSTON,
B. P. CILLEY.